(No Model.)
E. IVINS.
BUTTON FASTENER.
No. 339,555. Patented Apr. 6, 1886.
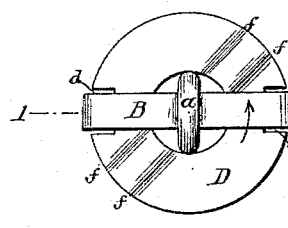
FIG.1.
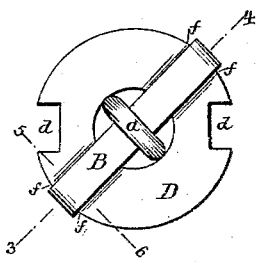
FIG.2.
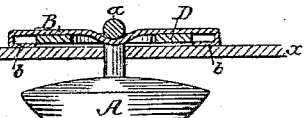
FIG.3.
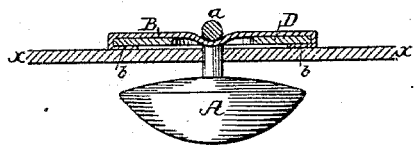
FIG.4.
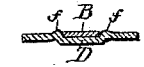
FIG.5.
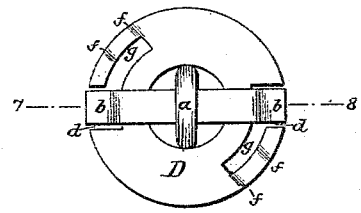
FIG.6.
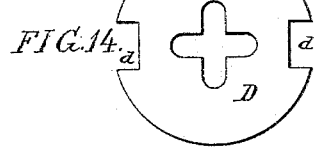
FIG.14.
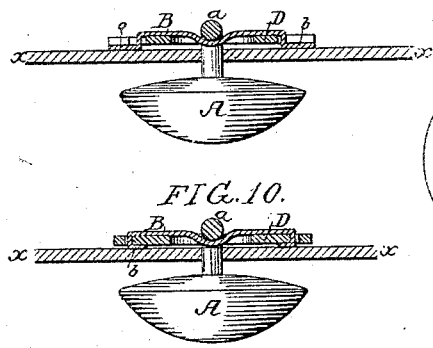
FIG.7.
FIG.10.
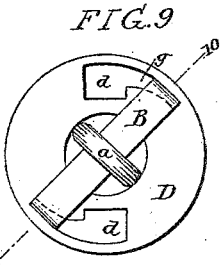
FIG.8.
FIG.9.
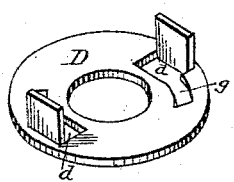
FIG.11.
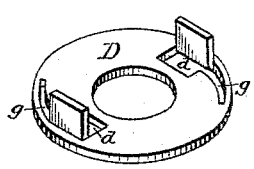
FIG.12.
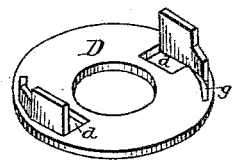
FIG.13.
Witnesses:
John E. Parker
Hamilton D. Turner
Inventor:
Ellwood Ivins
by his Attorneys
Howson & Sons

UNITED STATES PATENT OFFICE.

ELLWOOD IVINS, OF PHILADELPHIA, PENNSYLVANIA.

BUTTON-FASTENER.

SPECIFICATION forming part of Letters Patent No. 339,555, dated April 6, 1886.

Application filed January 18, 1886. Serial No. 188,905. (No model.)

*To all whom it may concern:*

Be it known that I, ELLWOOD IVINS, a citizen of the United States, and a resident of Philadelphia, Pennsylvania, have invented certain Improvements in Button-Fasteners, of which the following is a specification.

My invention relates to that class of button-fasteners in which a retaining-bar is passed transversely through the eye of the button and is confined to a washer-plate bearing against the back of the fabric, the object of my invention being to so construct a fastener of this class as to permit the ready application of the retainer to the washer and the ready securing of the same thereto, so as to prevent accidental displacement.

In the accompanying drawings, Figure 1 is a rear view of a retainer constructed in accordance with my invention, showing the parts in the position first assumed by them before the retainer is secured to the washer; Fig. 2, a similar view showing the retainer secured to the washer; Fig. 3, a transverse section of Fig. 1 on the line 1 2 and with the button in elevation; Fig. 4, a transverse section of Fig. 2 on the line 3 4; Fig. 5, a section of Fig. 2 on the line 5 6; Fig. 6, a rear view of another form of fastener embodying my invention; Fig. 7, a transverse section on the line 7 8, Fig. 6; Figs. 8 and 9, rear views showing still another form of fastening; Fig. 10, a transverse section on the line 9 10, Fig. 9; Figs. 11, 12, and 13, perspective views illustrating one of the features of my invention, and Fig. 14 a view showing a modified form of washer-plate.

A is the button, having at the rear the usual eye, *a*, to which is adapted the transverse retaining-bar B, having hooked ends *b*, which engage with the outer or other edge of a washer, D, which bears upon the back of the fabric *x*, to which the button is to be secured.

The combination of the eyed button, the washer, and the transverse retainer adapted to the eye of the button, and having hooked or bent ends engaging with said washer, has long been known; hence it should be understood that I do not claim this combination, broadly, my invention being limited to the construction which I have adopted for facilitating the application of the retainer to and its retention on the washer.

As shown in Figs. 1 to 4, the retainer has its ends bent downward and inward, and the washer has in its outer edge opposite recesses, *d*, through which the bent ends of the retainer can be passed from the back of the washer after passing the retainer through the eye of the button, so that on turning said retainer, as shown by the arrow in Fig. 1, for instance, or by turning the washer, the edge of said washer is caused to engage with the hooks, and thus secure the retainer to said washer. The movement of the retainer or washer is continued until said retainer rests between ribs or shoulders *f* on the washer, as shown in Fig. 5, these ribs or shoulders being such as to prevent any accidental displacement of the retainer or the washer.

In Figs. 6 and 7 I have shown a modification of my invention, in which the ends of the retainer are bent downward and outward, the washer having a segmental slot, *g*, for the reception of the downwardly-bent portion of the retainer, and this slot communicating with the recess *d*, through which the hooked portion of the retainer is passed in applying it to the washer. In this fastener the hooked portion of the retainer is held by that portion of the washer which forms the outer boundary of the segmental slot, and this portion may, if desired, be provided with retaining-ribs *f*, similar to those of the washer shown in Figs. 1 to 5.

In Figs. 8 to 10 I have shown another form of fastener, in which the retainer has inwardly-hooked ends engaging with that edge of the washer which forms the inner boundary of the segmental slot *g*, this edge being made cam-shaped, as shown, so as to engage with the hooked ends of the retainer as the latter or the washer is turned.

Instead of punching out from the washer the entire amount of metal necessary to form the recess *d* and slot *g*, I may simply bend up a portion of said metal, as shown in Figs. 11 to 13, for instance, this upturned portion being bent down after the retainer has been adjusted to its position, so as to secure said retainer in place.

In all of the washers shown in Figs. 1 to 14 the central opening is circular and of a diameter as great as the width of the eye *a* of the button; but in some cases I prefer to make the opening in the form of two slots crossing each other at an angle, as shown in Fig. 14, for instance, the eye being passed through one of these slots prior to the application of the retaining-bar, and being pulled down into and prevented from turning by the other slot after the retainer or washer has been moved so as to lock the two together.

I claim as my invention—

1. A button-fastener in which a retaining-bar adapted to the eye of a button and having opposite hooked or bent ends is combined with a washer having recesses for the passage of said bent or hooked ends of the retaining-bar, whereby said ends may be adjusted to such position that on turning the bar or washer the ends of the bar will engage with portions of the washer, all substantially as specified.

2. The combination of the retaining-bar having hooked or bent ends with the washer having segmental slots and enlarged recesses communicating therewith, all substantially as specified.

3. The combination of the retaining-bar having bent ends, the washer having recesses through which said ends can be passed into position for engagement with the washer, and ribs or projections which engage with the retaining-bar after it has been adjusted so as to engage with the washer, and thereby prevent any backward movement of said retaining-bar into position for release from the control of the washer, all substantially as specified.

4. The combination of the retaining-bar having bent ends with the washer having segmental slots, enlarged recesses communicating therewith, and bent portions which can be turned down in order to close said recesses, all substantially as specified.

In testimony whereof I have signed my name to this specification in the presence of two subscribing witnesses.

ELLWOOD IVINS.

Witnesses:
JOHN E. PARKER,
HARRY SMITH.